United States Patent [19]

Felter et al.

[11] 4,051,770
[45] Oct. 4, 1977

[54] VENTILATORS FOR MOBILE HOMES, AND THE LIKE

[76] Inventors: John V. Felter; Bill P. Taylor, Jr.; Kenneth M. Rudine, all of P.O. Box 7464, Houston, Tex. 77008

[21] Appl. No.: 613,088

[22] Filed: Sept. 15, 1975

[51] Int. Cl.² ............................................. F24F 7/06
[52] U.S. Cl. .................................. 98/43 B; 98/43 C; 98/21; 98/69; 98/72
[58] Field of Search ................ 98/43 C, 21, 72, 43 B, 98/69, 2.14, 42, 58; 52/198, 199, 200

[56] References Cited

U.S. PATENT DOCUMENTS

| | | | |
|---|---|---|---|
| 1,285,908 | 11/1918 | Blist | 98/72 |
| 2,569,319 | 9/1961 | Krug | 98/43 PS |
| 2,638,835 | 5/1953 | Strawsine | 98/43 PS |
| 2,912,916 | 11/1959 | Mohrman | 98/43 PS |
| 3,797,374 | 3/1974 | Jones | 98/72 |
| Re. 26,723 | 11/1969 | Averill et al. | 98/40 D |

*Primary Examiner*—John J. Camby
*Assistant Examiner*—Henry C. Yuen
*Attorney, Agent, or Firm*—Carl B. Fox, Jr.

[57] ABSTRACT

Ventilators for mobile homes, and the like, particularly of the type which have an attic space beneath the roof and above the ceiling of the mobile home interior. The ventilator has an intermediate air intake for ventilation of the attic space, so that the ventilator may be used to ventilate both the interior of the mobile home and the attic space.

12 Claims, 11 Drawing Figures

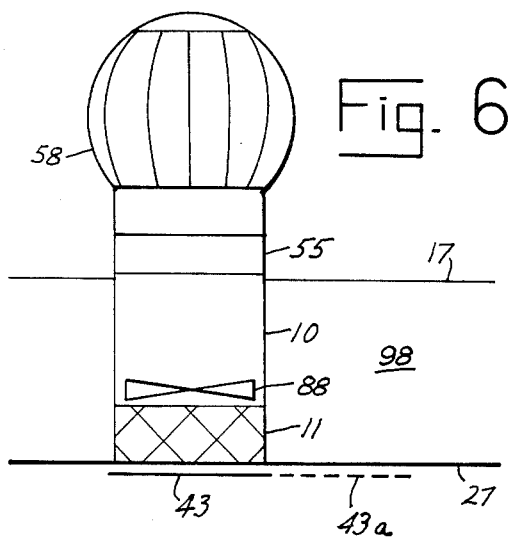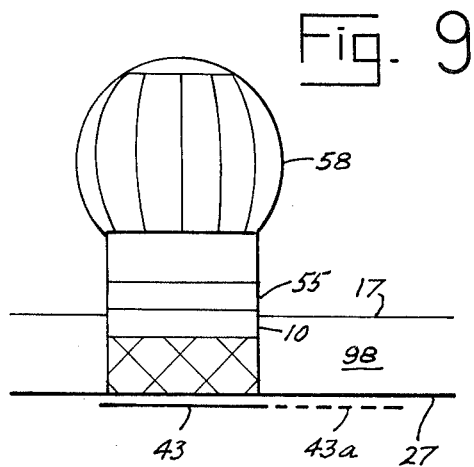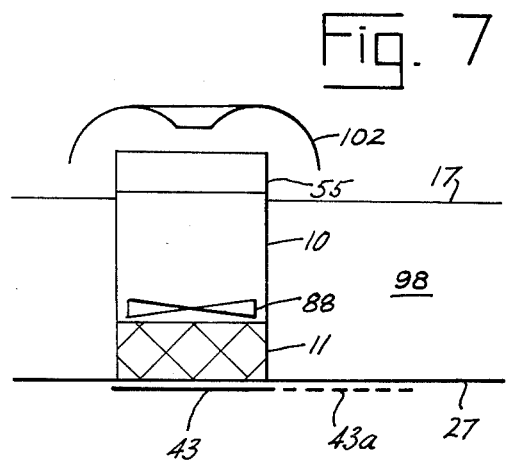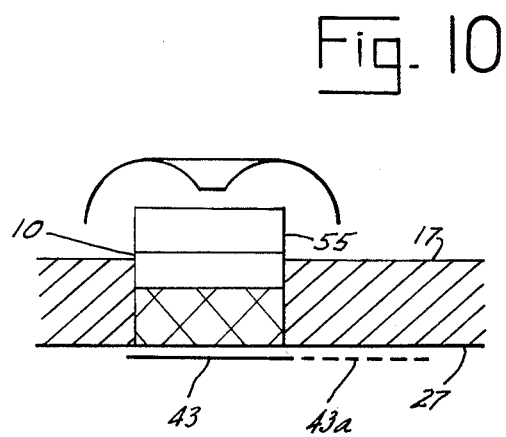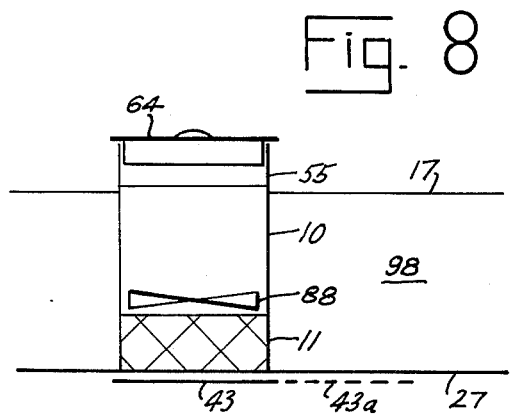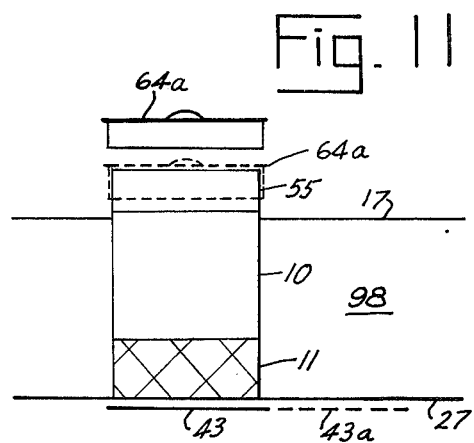

VENTILATORS FOR MOBILE HOMES, AND THE LIKE

BACKGROUND OF THE INVENTION

Mobile homes, trailers, motor homes, and campers of various other types may become very hot and uncomfortable particularly during the summer months because of inadequate provision for ventilation. Such vehicles often have screened ventilation openings in their roofs which permit hot air to leave through the roof by convention, but such ventilation is often inadequate to maintain comfortable interior temperatures. Many such vehicles are provided with air conditioning, but the expense and energy utilization may be objectionable. Window fans are sometimes used, but these have the objection that they block the view through the window in which they are installed and they do not remove air from the hottest part of the interior. This invention seeks to provide apparatus for improved ventilation of mobile homes and like vehicles.

SUMMARY OF THE INVENTION

The invention affords a ventilator for mobile homes and like vehicles which, particularly in the case of mobile homes having an attic space, will create vastly improved ventilation as compared with what has heretofore been provided. The ventilators afforded by the invention are of tubular shape, being disposed from the roof down through the ceiling and across the attic space if one exists, and having an electric motor driven ventilator fan disposed intermediate thereof. The fan may be omitted if desired. The ventilators are adapted to receive a standard rotary turbine ventilator at their upper ends, which may be removed to lower the over-all height of the vehicle if desired or necessary, and which may be closed and covered during periods of non-use of the ventilator. The ventilators may be used with a dome or cover instead of with a rotary ventilator. The ventilator housing has intermediate air inlet construction for drawing air out of the attic space of the mobile home, or the like, and has sliding closure for the inlet from the mobile home interior which may be opened or closed as desired.

The ventilators may be controlled by a thermostat or other suitable control device. The control may start the ventilator fan in operation at a predetermined temperature level, or the ventilator fan may be started in operation whenever the interior temperature significantly exceeds the exterior temperature.

The ventilator may be used in conjunction with air conditioning apparatus. The attic temperature may be very much hotter than the vehicle interior temperature, and if the attic is ventilated, the interior temperature will drop accordingly. By use of the ventilator, it is possible to significantly lower the attic temperature whereby air conditioning effectiveness may be greatly increased, or may not be necessary at all.

For ventilation of the attic of a mobile home, or the like, it is of course necessary that suitable peripheral air inlets be provided to the attic in order that the fanrotary ventilator combination, or either of them, may effectively draw air through the attic to cool it.

A principal object of the invention is to provide improved ventilators for mobile homes and like structures. Another object of the invention is to provide such ventilators which may be used to ventilate the attic space of a mobile home or like structure, and which may also ventilate the vehicle interior. A further object of the invention is to provide such ventilator apparatus which is simple in structure, simple to install, yet completely effective and safe.

Other objects and advantages of the invention will appear from the following detailed description of a preferred embodiment, reference being made to the accompanying drawings.

BRIEF DESCRIPTIONS OF THE DRAWINGS

FIG. 6-11 are schematic drawings showing six exemplary assemblies of the apparatus which may be used.

DESCRIPTIONS OF THE PREFERRED EMBODIMENTS

Figure 1:
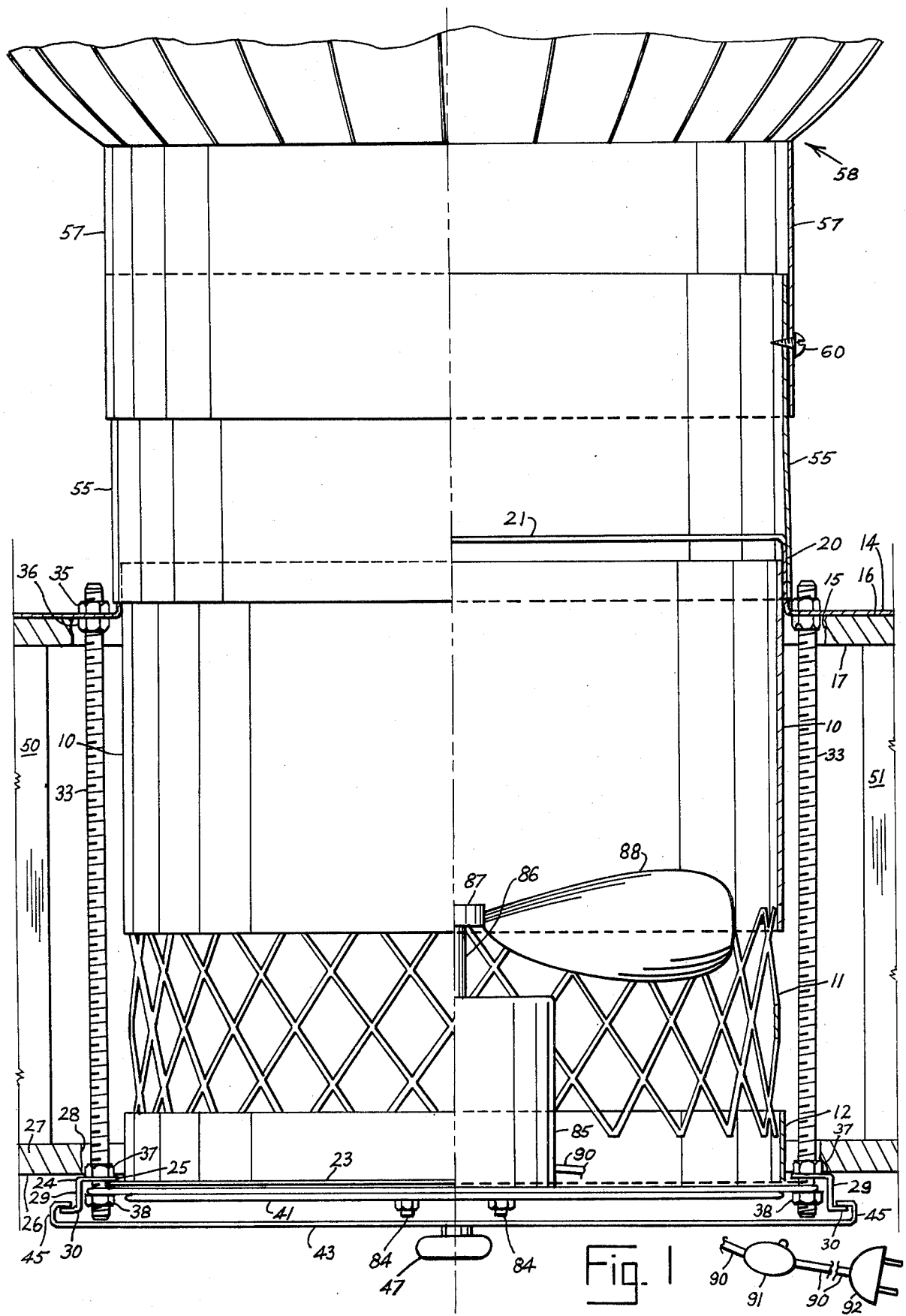
FIG. 1 is a vertical quarter-section of a ventilator of preferred form according to the invention.

Referring now to the drawings in detail, the ventilator housing structure includes a vertically disposed tube or duct 10 around the lower interior of which is tack welded in place a cylindrically formed strip of expanded metal 11, around the lower end of which is tack welded a lower housing tube or duct 12. A flash plate 14 is adapted to seat around the ventilator opening 15 flatly against upper surface 16 of the roof 17 of a mobile home or like vehicle or structure. The flash plate 14 may be adhesively or otherwise sealed to the roof surface to prevent leakage.

Flash plate 14 has a cylindrical formation 20 which fits closely around the upper end of housing tube 10, which extends slightly above the roof for this purpose. One or more narrow cross elements 21 extend across the upper end of tubular portion 20 of the flash plate structure.

Figure 2:
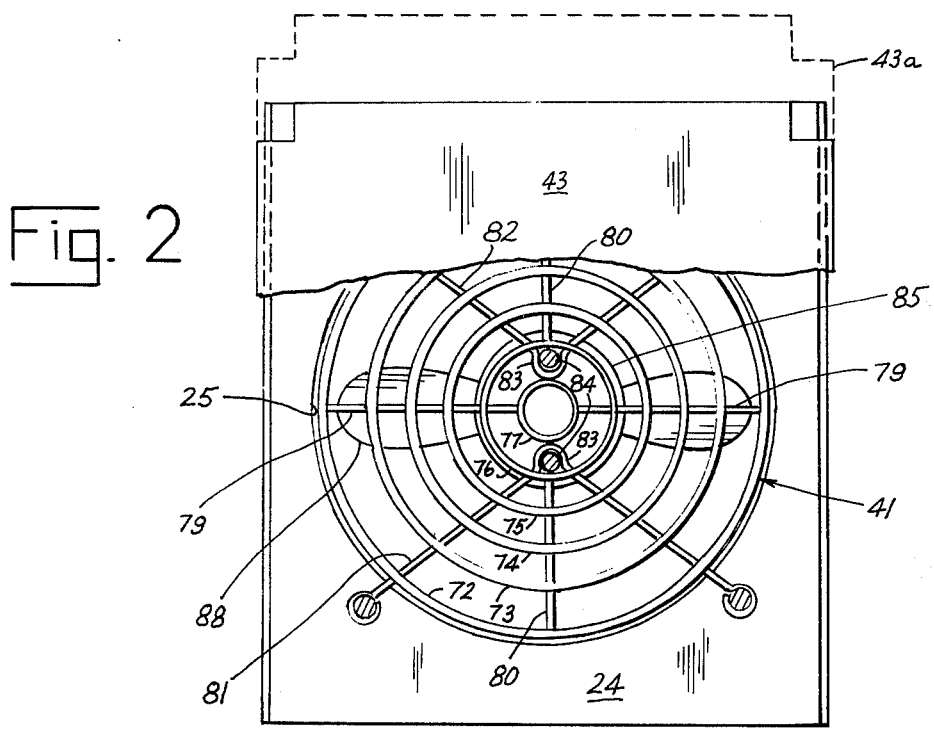
FIG. 2 is a reduced bottom view of the ventilator shown in FIG. 1.

Housing tube 12 has a narrow outwardly extending flange 23 around its lower end. A rectangular orifice plate 24 of rectangular shape has a circular opening 25 therethrough through which housing tube 12 is disposed. The horizontal upper portion of plate 24 fits flushly against lower side 26 of ceiling 27, the ceiling having an opening 28 therethrough to receive the ventilator structure. Plate 24 has, along opposite parallel sides, downturned flange portions 29 which are outturned at their lower ends 30. A suitable number of all-thread screws 33 are disposed through suitable openings through flashing plate 14 and orifice plate 24, four being shown. The screws 33 are connected to the flashing plate 14 by upper and lower nuts 35, 36 and are similarly connected to orifice plate 24 by upper and lower nuts 37, 38. The all-thread screws may be broken to the correct length depending on the spacing between roof 17 and celing 27, and housing 10 may be cut off if necessary to adjust its length depending on the spacing roof 17 and celing 27. A combination motor support and grill or shield 41, best shown in FIG. 2, is connected to the all-threaded screws above the lower nuts 38. Nuts 36 may be omitted to simplify assembly if desired.

A cover plate or damper 43 has inturned edges 44, 45 which engage above the flanges 30 of orifice plate 24. Cover 43 has a handle in the form of knob 47 connected thereto at its center for movement of the cover with respect to opening 25 of the orifice plate. Cover 43 may be slid to position 43a to uncover opening 25, or may be slid over the opening to close it, depending upon whether or not ventilation of the mobile home interior is desired.

The roof 17 and ceiling 27 may be interconnected by structural members 50, 51 which may take any form, different or like those shown in the drawing.

A cylindrical tube 55 is secured by tack welding, riveting, or the like around collar 20 of flash plate 14. Tube 55 extends some inches above the upper surface of the roof. The lower tubular structure 57 of a rotary turbine ventilator 58 may be fitted slidably over tube 55 and may be secured in place by one or more sheet metal screws 60.

Figure 3:
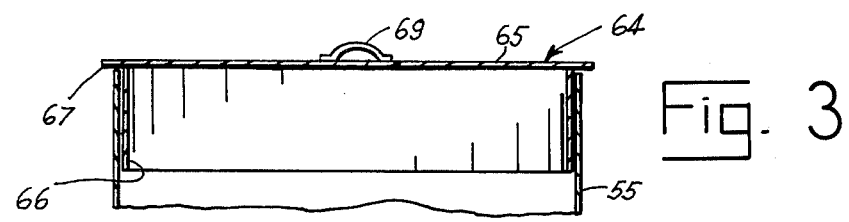
FIG. 3 is an axial cross section showing the upper portion of the ventilator shown in FIG. 1, and showing a closure which may be used in conjunction with the invention.

The turbine ventilator 58 may be removed from the upper end of tube 55 if desired. Sometimes to reduce the overall height of the vehicle it may be necessary for the ventilator to be removed. Because of wind noise and the like during traveling, some users may desire to remove the rotary ventilator during travel. Referring now to FIG. 3, a cover 64 may be disposed to close the upper end of tube 55 whenever the turbine ventilator is removed. Cover 64 includes a flat circular plate 65 downwardly from which extends a skirt 66. An overhanging flange 67 is disposed around the skirt, to cover the upper edge of tube 55. The cover may have a handle 69 for use in installing and removing the cover. If considered necessary, the cover may be screwed in place in the same manner as the lower tubular portion 57 of rotary ventilator 58, but this will usually not be necessary if skirt 66 fits tightly within tube 55.

The combination fan-motor support and safety grill 41 is best shown in FIG. 2 of the drawings. Grill 41 is formed of welded wire and includes circular elements 72-77 welded to brace elements 79, 80 and fan support elements 81, 82. The wire elements are welded together at each crossing so that the wire structure is completely rigid. Fan support elements 81, 82 each has a loop structure 83 to receive the studs 84 of the fan motor 85. Thus, the fan motor 85 is secured to the grill which supports it at the grill center. Motor 85 has rotative shaft 86 at the end of which is fixed a hub 87 having fan blades 88. The blades are located at the upper end of expanded metal cylinder 11, and normally will rotate in a direction to draw air up through the ventilator apparatus, the air intake from the attic space being through the openings expanded metal cylinder 11 and the air intake from the mobile home interior being through opening 25 and cylinder 12, whenever damper 43 is opened.

Electric motor 85 is energized by electrical power supplied through cord 90. Cord 90 may include a switch 91 and plug 92 which may be plugged into any electrical outlet, or the cord 90 may be wired into the electrical system of the mobile home in a permanent manner and provided with a wall switch, or the like.

Figure 5:
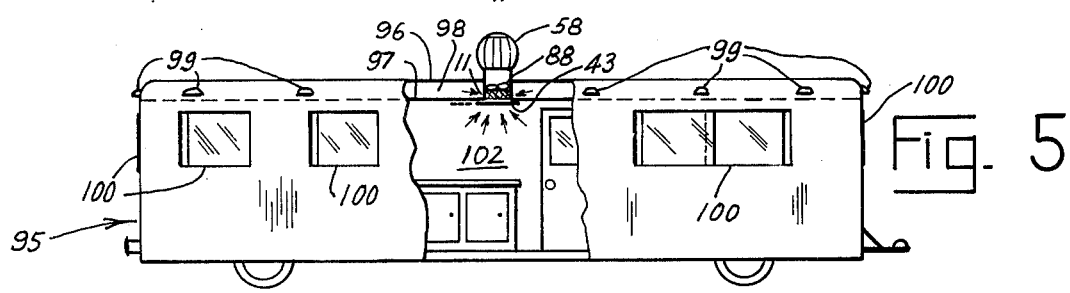
FIG. 5 is an illustration of the ventilator according to the invention as used to ventilate a mobile home.

Referring now to FIG. 5 of the drawings, a ventilator according to the invention is shown mounted through the roof of a mobile home 95. Mobile home 95 has roof 96 and ceiling 97. The attic space 98 is provided with air inlets 99 around its edge, of any suitable form. The mobile home has windows 100. When blades 88 of the ventilator fan are rotating, air is drawn through inlets 99 and out through the ventilator to ventilate and cool the attic. This will significantly lower the temperature at the interior 102 of the mobile home. If desire, door 43 of the ventilator may be opened to also draw air from the upper level of the interior of the mobile home, air for this purpose being drawn in through one or more open windows 100. In case the mobile home 95 is equipped with one or more air conditioners, ventilation of the attic will serve to make the air conditioners more efficient, since part of the cooling will be accomplished through use of the ventilator.

The ventilator apparatus is adaptable for use with mobile homes having different spacings between the roof 17 and the ceiling 27. In case the spacing is less than the vertical dimensions of housing cylinders 10, 11, 12, the tube 10 may be cut off to reduce the height of the apparatus. If there is no attic space, the height of tube 10 may be cut off according to the roof thickness and the apparatus installed through the roof, the expanded metal section 11 then not being effective as an air intake, but air may still be taken in through the lower opening of the ventilator to accomplish ventilation of the vehicle interior.

The flash plate 14 may be tilted to accommodate a pitched roof of moderate pitch. For mobile homes of 14 foot by 70 foot size, the ventilator is adapted to change the air in the ceiling and the mobile home interior once every 6 minutes. For smaller homes, the air circulation will occur in less than 6 minutes.

Figure 4:
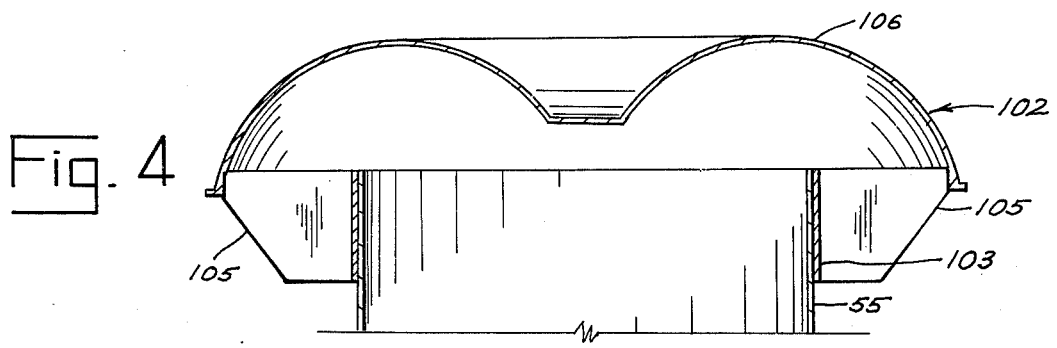
FIG. 4 is a axial cross section showing the upper portion of the ventilator shown in FIG. 1, and showing a ventilator cover or dome which may be used in conjunction with the invention.

Referring to FIG. 4 of the drawings, a ventilator cover or dome 102 may be affixed to the upper end of tube 55. Cover 102 has connection tube 103 which slips over tube 55 and may be affixed by one or more sheet metal screws or rivets (not shown), radial plates 105 supporting the deflection element 107. The cover shown is of the form disclosed in application Ser. No. 597,544, filed July 21, 1975, but other forms of covers may be used.

The motor 85 and fan 88 may be included in the apparatus as described, or may be omitted, in which case ventilation will be by convection and will be considerably less effective. If the fan is provided, ventilation may be obtained in some degree by convection even through the fan is not operated. Referring now to FIGS. 6-11 of the drawings, six exemplary forms of assembly of the apparatus are indicated, and other combinations of the apparatus elements than those shown may be employed. In FIG. 6, the complete ventilator apparatus is shown, and ventilation is achieved by operation of rotary turbine ventilator 58 as well as by operation of fan 88. Attic air is taken in through expanded metal cylinder 11. Room air is taken in from below the ventilator whenever damper 43 is opened to position 43a.

In FIG. 7, the turbine ventilator 58 is replaced by a cover 102, and ventilation of the attic or of the attic and room is achieved by convection or by operation of fan 88. FIG. 8 shows the ventilator closed by a cover 64, which may be used during periods of cold weather, or when height reduction of the unit is desired, for example for traveling or storage.

Referring to FIG. 9, the roof 17 in this case is relatively closer to ceiling 27 than in FIG. 6. Tube 10 has been shortened to accommodate the closer spacing. A fan 88 may be provided, but in FIG. 9 the fan is omitted and ventilation of the attic and room may be achieved by operation of the turbine ventilator 58 and by convection. If damper 43 is closed, only attic ventilation is obtained, and interior cooling results because of attic cooling.

In FIG. 10, the ventilator is shown installed through a roof having no attic space. Tube 10 is shortened sufficiently for the installation. In this case, expanded metal cylinder 11 will be ineffective as an air intake, and ventilation of the room space is obtained by convention. A fan 88 and/or a turbine ventilator 58 may be used in this type of installation.

In FIG. 11 there is shown a simple form of installation, without the turbine ventilator 58, and without the fan 88, and without the cover 102. Ventilation in this case, of the attic or of the attic and room, is achieved by convection only. The cover 64 may be used to close the ventilator whenever desired or necessary.

The tube 55 can be omitted from the assemblies if desired, with the rotary turbine ventilator or other outlet fitting connected directly around collar 20.

The skirt 66 of cover may fit around the outside of tube 55 or collar 20 instead of inside of the tube or collar, if desired, as shown in FIG. 11 at 64a.

As will be apparent, other combinations of the apparatus elements are possible, depending on the requirements of the installation and depending on the results desired.

While preferred embodiments of the invention have been described and shown in the drawings, many modifications thereof may be made by a person skilled in the art without departing from the spirit of the invention, and it is intended to protect by Letters Patent all forms of the invention falling within the scope of the following claims.

We claim:

1. Ventilator apparatus comprising vertically disposed unitary tube means adapted for mounting through wall means, said tube means comprising an upper imperforate tubular portion and a lower imperforate tubular portion and an intermediate tubular portion formed of expanded sheet material in lattice form connected between said upper and lower tubular portions, said upper tubular portion being of plain tubular form throughout its length and being adapted to be trimmed at its upper end to reduce its vertical length to adapt to reduce thickness of said wall means, the upper end of said tube means comprising an air outlet and the lower end of said tube means and said intermediate tubular portion comprising air inlets, including a flash plate for engaging the upper surface of said wall means disposed freely around the upper end of said upper tubular portion and having an upstanding inner sleeve portion disposed around the upper end of said upper tubular portion, an outer tube engaged around said sleeve and extending upwardly therefrom, said flash plate and said outer tube preventing leakage around said ventilator apparatus at the upper surface of said wall means, said wall means including a roof and a ceiling and an attic space therebetween, said intermediate tubular portion being adapted to be positioned in said attic space, said lower end of said tube means having connection means adapted for connection to said ceiling, said upper end of said tube means being adapted to extend through said roof whereby air may be simultaneously ventilated from said attic space and from a room beneath said ceiling through said ventilator apparatus.

2. The combination of claim 1, including a ventilation cover means adapted for connection to said upper end of said upper tubular portion to permit air from said air outlet to flow outwardly thereunder and to prevent rain water from entering said air outlet.

3. The combination of claim 2, including a closure adapted to close said air outlet when no said cover means is connected to said air outlet and when air outflow from said air outlet is not desired.

4. Ventilator apparatus, comprising vertically disposed tube means adapted for mounting through wall means, said tube means comprising an upper imperforate tubular portion and a lower imperforate tubular portion and an intermediate tubular portion formed of expanded sheet material in lattice form connected between said upper and lower tubular portions, said upper tubular portion being of plain tubular form throughout its length whereby it may be trimmed at its upper end to reduce its vertical length to adapt to reduce thickness of said wall means, the upper end of said tube means comprising an air outlet and the lower end of said tube means and said intermediate tubular portion comprising air inlets, a flash plate for engaging the upper surface of said wall means disposed freely around the upper end of said upper tubular portion and having an upstanding inner sleeve portion disposed around the upper end of said upper tubular portion, an outer tube engaged around said sleeve and extending upwardly therefrom, said flash plate and said outer tube preventing leakage around said ventilator apparatus at the upper surface of said wall means, said lower tubular portion having an outwardly extending flange around its lower end, and orifice plate having an opening therethrough disposed around said lower surface of said wall means, and means extending between said flash plate and said orifice plate outside of said tube means for connection said flash plate and said orifice plate together with said wall means disposed therebetween to fix said ventilator apparatus through said wall means.

5. The combination of claim 4, including a fan disposed within said tube means adjacent the upper end of said intermediate tubular portion for propelling air from said inlets to said outlet.

6. The combination of claim 4, said means connecting said flash plate and said orifice plate together comprising plural all-thread screws disposed through holes through said flash plate and orifice plate and affixed thereto by nuts at opposite sides of said flash plate and orifice plate.

7. The combination of claim 6, wherein said upper tubular portion and said screws are adapted to be shortened in length to adapt to reduce thickness of said wall means.

8. The combination of claim 4, wherein said wall means includes a roof and a ceiling and an attic space therebetween, said intermediate tubular portion being adapted to be positioned in said attic space, said lower tubular portion being adapted for connection to said ceiling, said upper tubular portion being adapted to extend through said roof, whereby air may be simultaneously ventilated from said attic space and from a room beneath said ceiling through said ventilator apparatus.

9. The combination of claim 8, including a rotary turbine ventilator connected around the upper end of said upper tubular portion.

10. The combination of claim 8, including a ventilation cover means connected to the upper end of said upper tubular portion.

11. The combination of claim 8, including a removable closure for said upper end of said upper tubular portion.

12. The combination of claim 8, including a ventilation cover means adapted for connection to said upper end of said upper tubular portion to permit air from said air outlet to flow outwardly thereunder and to prevent rain water from entering said air outlet.

* * * * *